United States Patent
Nadiminti et al.

(10) Patent No.: US 11,805,117 B2
(45) Date of Patent: **\*Oct. 31, 2023**

(54) ONBOARDING FOR REMOTE MANAGEMENT

(71) Applicant: Hewlett Packard Enterprise Development LP, Spring, TX (US)

(72) Inventors: Syama Sundararao Nadiminti, Karnataka (IN); Blaine R. Southam, Ft. Collins, CO (US); Dominic Fernandes, San Jose, CA (US); Sunil Malhotra, Karnataka (IN); Daniel Edward Frank, Ft. Collins, CO (US); Niharika Mateti, Houston, TX (US); Matthew Lewis Fischer, Ft. Collins, CO (US); John Thomas Weidenfeller, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,190

(22) Filed: Mar. 21, 2023

(65) Prior Publication Data
US 2023/0224292 A1    Jul. 13, 2023

Related U.S. Application Data

(63) Continuation of application No. 17/446,764, filed on Sep. 2, 2021, now Pat. No. 11,637,822.

(51) Int. Cl.
*H04L 9/40* (2022.01)
(52) U.S. Cl.
CPC ........ *H04L 63/0823* (2013.01); *H04L 63/102* (2013.01); *H04L 63/126* (2013.01); *H04L 63/18* (2013.01)

(58) Field of Classification Search
CPC . H04L 63/0823; H04L 63/102; H04L 63/126; H04L 63/18
See application file for complete search history.

(56) References Cited

U.S. PATENT DOCUMENTS

| 9,774,604 B2 | 9/2017 | Zou et al. |
| 9,922,225 B2 | 3/2018 | Likar |

(Continued)

FOREIGN PATENT DOCUMENTS

| WO | 2019/156716 A1 | 8/2019 |

OTHER PUBLICATIONS

DMTF Redfish, Document Identifier: DSP0272, Version: 1.3.1, Redfish Interoperability Profiles, Apr. 6, 2021 (29 pages).

(Continued)

*Primary Examiner* — Phuoc H Nguyen
*Assistant Examiner* — Steven C Nguyen
(74) *Attorney, Agent, or Firm* — Trop, Pruner & Hu, P.C.

(57) ABSTRACT

In some examples, a cloud-based management system receives information identifying electronic devices to be onboarded for cloud-based management by the cloud-based management system, receives, from a first electronic device, a request to establish a secure connection between the cloud-based management system and the first electronic device, and receives, from the first electronic device, a certificate. The cloud-based management system confirms, based on information in the certificate and the information identifying the electronic devices to be onboarded for cloud-based management, that the cloud-based management system is to perform the cloud-based management of the first electronic device over the secure connection.

18 Claims, 5 Drawing Sheets

(56) References Cited

U.S. PATENT DOCUMENTS

| | | | |
|---|---|---|---|
| 10,331,478 B2 | 6/2019 | Manescu et al. | |
| 10,601,956 B2 | 3/2020 | Nucci et al. | |
| 2009/0119719 A1* | 5/2009 | Matsuzaki | H04L 12/281 |
| | | | 725/74 |
| 2018/0189344 A1 | 7/2018 | Akwule et al. | |
| 2019/0373083 A1* | 12/2019 | Nucci | H04L 63/062 |
| 2020/0067938 A1 | 2/2020 | Smith et al. | |
| 2020/0097353 A1 | 3/2020 | Smith et al. | |
| 2020/0162318 A1* | 5/2020 | Patil | G06F 9/4416 |
| 2020/0329357 A1* | 10/2020 | McClellan | A61B 5/022 |
| 2020/0359349 A1 | 11/2020 | Duo et al. | |
| 2020/0374700 A1* | 11/2020 | Smith | H04L 9/3268 |
| 2021/0152545 A1* | 5/2021 | Park | H04L 9/3268 |
| 2022/0346160 A1* | 10/2022 | Agrawal | H04W 76/10 |

OTHER PUBLICATIONS

Fette et al., Internet Engineering Task Force (IETF). Request for Comments: 6455, Category: Standards Track, ISSN: 2070-1721, The WebSocket Protocol, Dec. 2011 (71 pages).

* cited by examiner

ONBOARDING FOR REMOTE MANAGEMENT

CROSS-REFERENCE TO RELATED APPLICATIONS

This application is a continuation application of and claims priority to application Ser. No. 17/446,764, filed on Sep. 2, 2021, the contents of which are hereby incorporated by reference in their entireties.

BACKGROUND

Electronic devices can be managed from a cloud, such as by using an as-a-Service (aaS) cloud-based management system. Examples of management tasks that can be performed with respect to electronic devices include any or some combination of the following: monitoring the health of an electronic device, sending a program update to an electronic device, sending control and configuration commands to an electronic device (e.g., to reset or reboot the electronic device), and so forth.

BRIEF DESCRIPTION OF THE DRAWINGS

Some implementations of the present disclosure are described with respect to the following figures.

Figure 1:
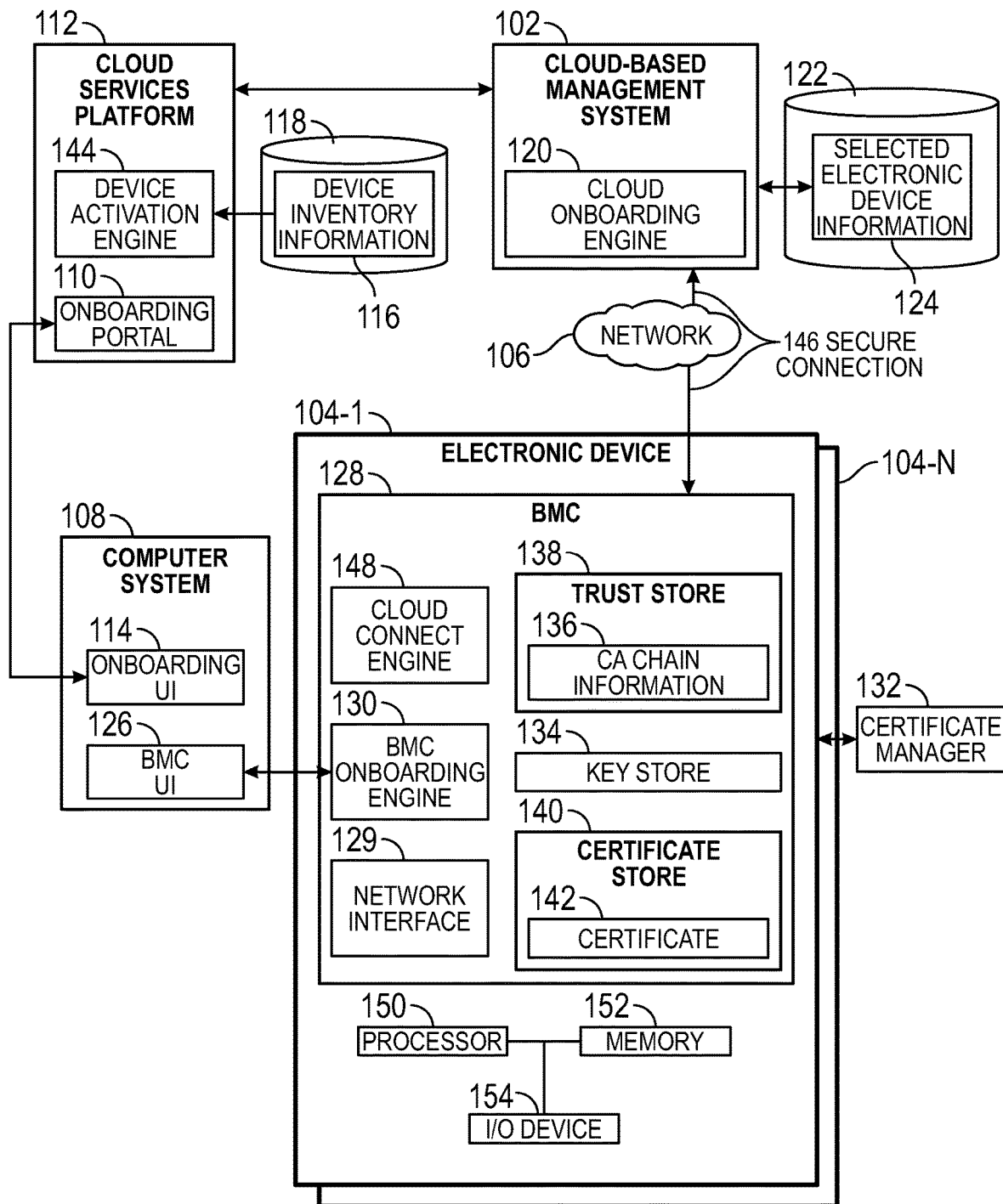
FIG. 1 is a block diagram of an arrangement that includes a cloud-based management system, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A cloud-based management system can manage electronic devices over a network, such as a local area network (LAN), a wide area network (WAN), a public network (e.g., the Internet), and so forth. Examples of electronic devices can include any or some combination of the following: server computers, desktop computers, notebook computers, tablet computers, smartphones, game appliances, Internet-of-Things (IoT) devices, home appliances, storage devices, communication nodes, vehicles, vehicle controllers, and so forth.

The electronic devices can be deployed on customer premises. As used here, "customer premises" can refer to any arrangement of electronic devices, such as within a data center, a cloud environment, a storage area network, a third party co-location, or any other location (whether private or public). Note that customer premises can be located at a single geographic location or multiple geographic locations.

The cloud-based management system can be part of a cloud environment that is separate from the customer premises. In some examples, the customer premises can be operated by a first entity, while the cloud-based management system can be operated by a second entity that is different from the first entity. Such entities that operate and/or own customer premises can include business concerns, government agencies, educational organizations, individuals, so forth.

In some examples, an agent (implemented using hardware or machine-readable instructions) can be deployed on customer premises. The agent can act as a proxy between electronic devices to be managed and a cloud-based management system.

"Onboarding" an electronic device for cloud-based management can refer to performing tasks to allow the electronic device to establish a connection with a cloud-based management system so that remote management of the electronic device by the cloud-based management system can occur. In some examples, electronic devices on customer premises can initiate the connection with the cloud-based management system.

In some examples, after initiating the connection discussed above, an electronic device can publish information associated with the electronic device to the agent. The agent can send, in response to a device discovery request from the cloud-based management system, a response containing the information associated with the electronic device (as published by the electronic device) to the cloud-based management system.

Since the onboarding process involves an agent deployed at customer premises, the security of the onboarding process depends upon a security mechanism used between the agent and the cloud-based management system. For example, mutual Transport Layer Security (TLS) can be used to ensure mutual authentication between the two sides, and traffic is encrypted to secure communications. In some cases, security for the onboarding of electronic devices for cloud-based management can be complex and/or a suffer from vulnerabilities.

In accordance with some implementations of the present disclosure, agentless onboarding techniques or mechanisms are used to onboard electronic devices for cloud-based management by a cloud-based management system. In some examples, the agentless onboarding techniques or mechanisms use controllers in the electronic devices and a cloud service that provides information identifying electronic devices to be onboarded to the cloud-based management system. "Agentless" onboarding can refer to an onboarding technique or mechanism that avoids use of a separate agent as part of electronic device discovery, where the agent is deployed on customer premises and is provided as a proxy between electronic devices and the cloud-based management system.

FIG. 1 is a block diagram of an example arrangement that includes a cloud-based management system 102 that is to perform cloud-based management of electronic devices 104-1 to 104-N, where $N \geq 1$. Examples of cloud-based management tasks that can be performed by the cloud-based management system 102 include any or some combination of the following: monitoring a health of an electronic device, sending a program update to an electronic device to upgrade a program in the electronic device, resetting or rebooting an electronic device, and/or other management tasks.

The electronic devices 104-1 to 104-N are coupled to the cloud-based management system 102 over a network 106.

In the example of FIG. 1, a computer system 108 can be used to enable cloud-based management of electronic devices, including the electronic devices 104-1 to 104-N. The computer system 108 can include a desktop computer, a notebook computer, a tablet computer, or any other type of computer system. In some examples, the computer system 108 can be used by a user (e.g., an administrator or another user) to onboard electronic devices to be subject to cloud-based management.

Although reference is made to a user at the computer system 108 enabling cloud-based management of electronic devices, in other examples, a program or machine can initiate the onboarding of the electronic devices 104-1 to 104-N for cloud-based management.

The computer system 108 allows a user to interact with an onboarding portal 110 of a cloud services platform 112. A "platform" can refer to a single computer or a collection of computers. In some examples, the cloud services platform 112 provides a collection of cloud services such as user management, account management, authentication, authorization, and a portal, such as the onboarding portal 110 shown in FIG. 1. In other examples, the cloud services platform 112 can provide different services.

A "portal" refers to a point of access of a device or service. For example, the portal can be at a specified uniform resource locator (URL), a network address (e.g., an Internet Protocol (IP) address), and so forth.

Although FIG. 1 depicts the cloud services platform 112 as being separate from the cloud-based management system 102, in other examples, the cloud services platform 112 and the cloud-based management system 102 can be part of a single platform.

In yet further examples, the onboarding portal 110 can be part of the cloud-based management system 102.

The computer system 108 can communicate with the cloud services platform 112 and the electronic devices 104-1 to 104-N over a network, such as the network 106.

In some examples, the computer system 108 can present an onboarding user interface (UI) 114 when accessing the onboarding portal 110. The user at the computer system 108 can use the onboarding UI 114 to log into the onboarding portal 110 using credentials of the user, such as a username and password or another credential.

The ensuing discussion refers to both FIGS. 1 and 2.

The user at the computer system 108 initiates a process 202 to identify electronic devices to be onboarded for cloud-based management. The process 202 includes tasks 202-1 to 202-5.

Once the user has logged into the onboarding portal 110, the onboarding portal 110 can receive (at 202-1), from the onboarding portal 110, a list of electronic devices that are associated with a customer account. A "customer account" can refer to an account of a customer (e.g., a business concern, an educational organization, a government agency, and individual, etc.). The customer may have registered with the customer account to list electronic devices that are eligible for cloud-based management.

The electronic devices associated with the customer account may be identified based on device inventory information 116 stored in a cloud services database 118. The device inventory information 116 can include device identification information such as any or some combination of: a serial number of an electronic device, a product identifier of the electronic device, a universally unique identifier (UUID), and so forth. The device inventory information 116 can associate different subsets of electronic devices with different customer accounts. The cloud services database 118 can be stored in a collection of storage devices, where a "collection of storage devices" can refer to a single storage device or multiple storage devices.

The computer system 108 can present, in the onboarding UI 114, the list of electronic devices that are associated with a customer account. The user at the computer system 108 can select, from the list presented in the onboarding UI 114, electronic devices to be onboarded for cloud-based management by the cloud-based management system 102. For example, the electronic devices in the list may have checkboxes or other user-selectable items next to respective identifiers of the electronic devices. In some examples, the identifiers can include names of the electronic devices, and/or serial numbers and product identifiers of the electronic devices. A product identifier can identify a line or category of products, whereas a serial number identifies a specific electronic device.

The user can select a checkbox for each electronic device that is to be subject to cloud-based management. In other examples, instead of selecting from a list in the onboarding UI 114, the user can upload a list of electronic devices that are to be onboarded for cloud-based management.

In other examples, other techniques for selecting electronic devices for onboarding can be employed.

The computer system 108 receives (at 202-2), based on the user selection, device identification information identifying the selected electronic devices, and the computer system sends (at 202-3) the device identification information identifying the selected electronic devices to the onboarding portal 110. In some examples, the device identification information can include any or some combination of: serial numbers, product identifiers, UUIDs, etc. In other examples, the device identification information can include other types of electronic device identification data.

For each electronic device that is selected to be onboarded, the cloud services platform 112 can send (at 202-4) a respective event to the cloud-based management system 102.

The event sent to the cloud-based management system 102 can include device identification information for the respective electronic device. Although reference is made to sending an event for each corresponding selected electronic device, it is noted that in other examples, an event can be associated with multiple electronic devices, in which case the event can include device identification information of the multiple electronic devices. The event can also contain customer identification information to identify a customer with which the electronic devices are associated.

In response to receiving a collection of events (including a single event or multiple events) relating to the selected electronic devices, a cloud onboarding engine 120 in the cloud-based management system 102 can add (at 202-5) information associated with the selected electronic devices to a cloud-based management database 122. The information added is represented as selected electronic device information 124 in the cloud-based management database 122. The selected electronic device information 124 can include device identification information and possibly other information.

The selected electronic device information 124 can also associate a state with each selected electronic device, where the state can be set to a first value to indicate that the electronic device is to be managed by the cloud-based management system 102, and to a different second value if the electronic device is not to be managed by the cloud-based management system 102.

Figure 2A:
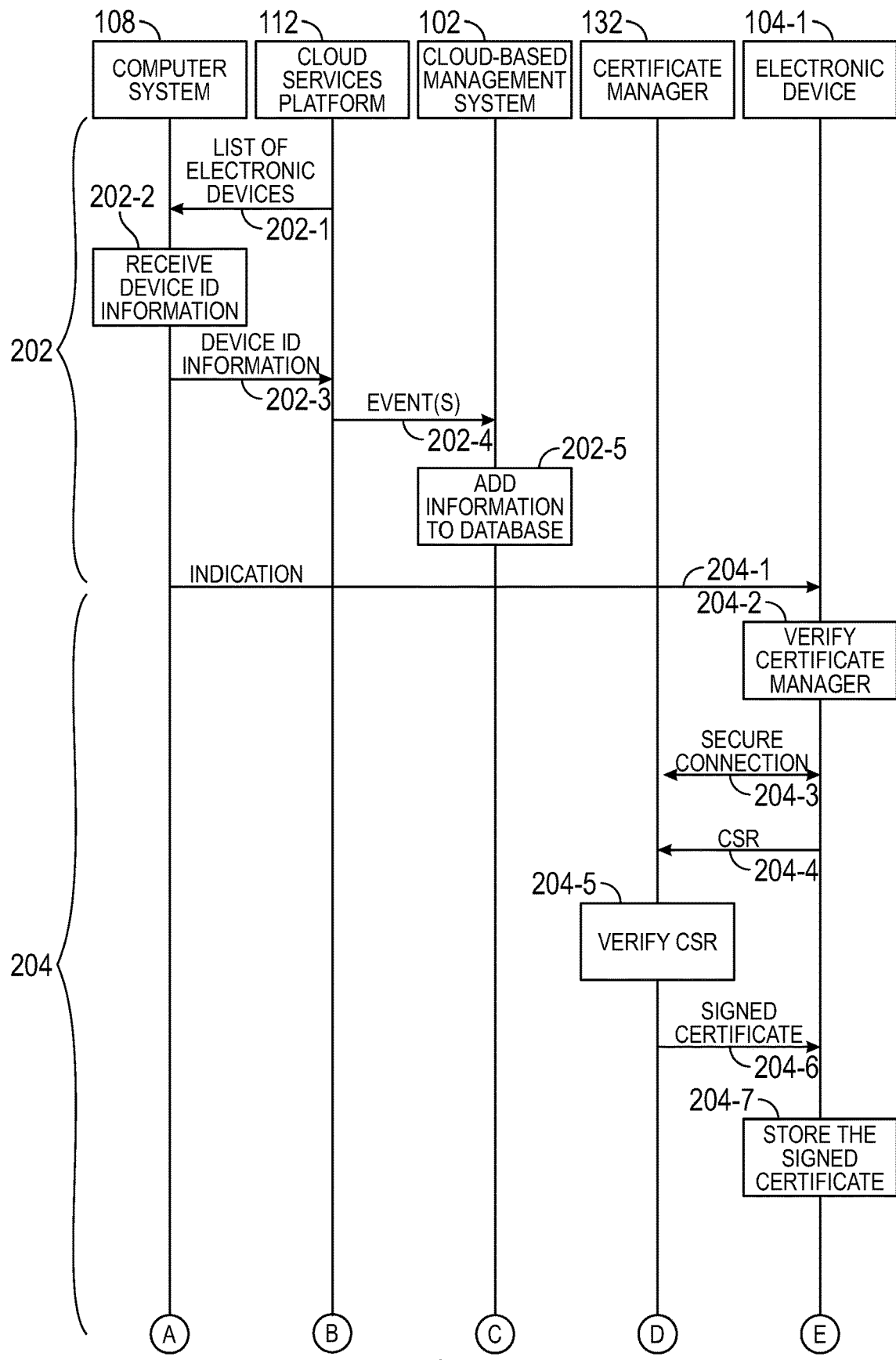
FIGS. 2A-2B are a flow diagram of a cloud-based management onboarding process according to some examples.
Figure 2B:
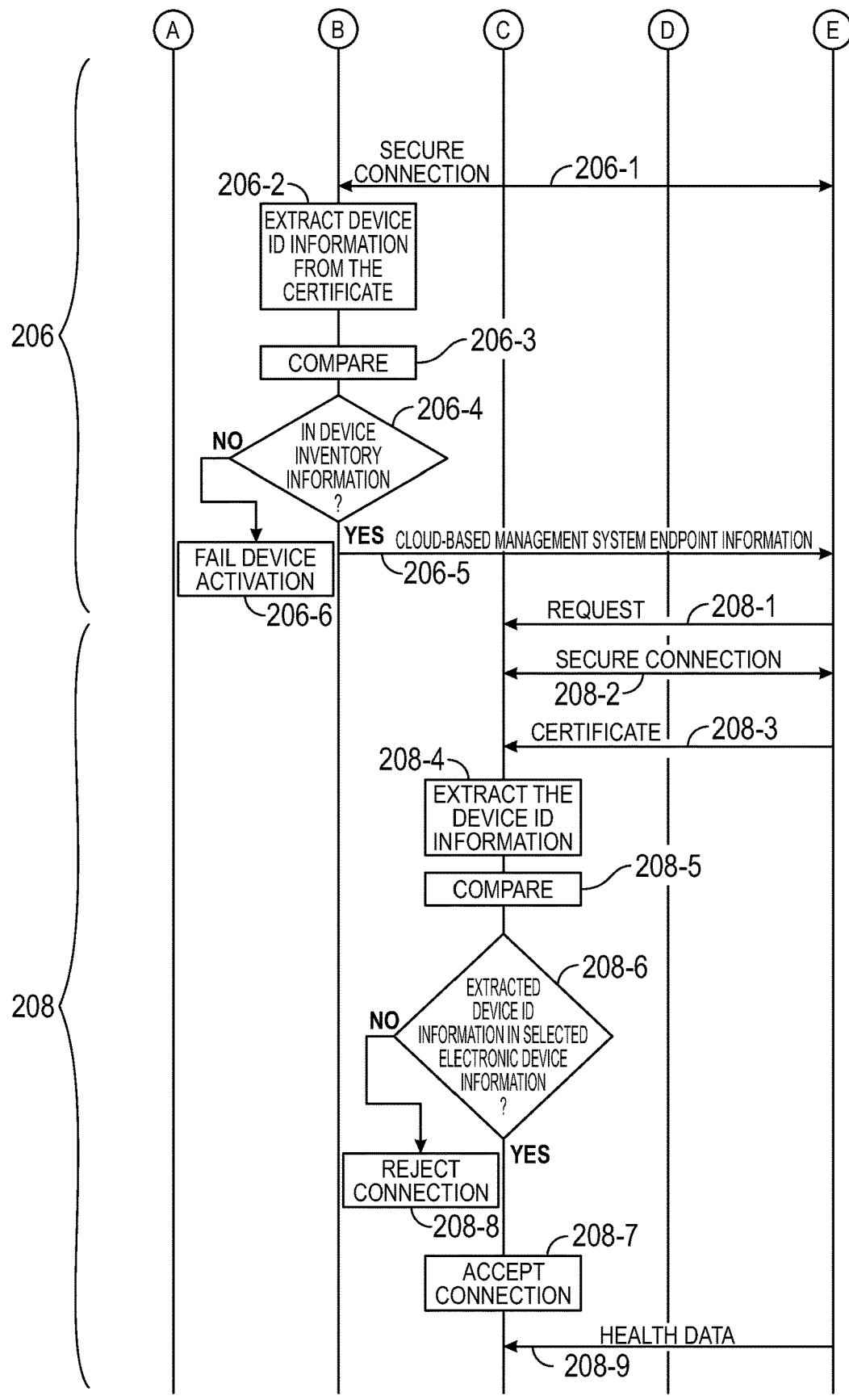

The user at the computer system 108 initiates a process 204 to enable, at each selected electronic device (104-1 to 104-N), cloud-based management. FIGS. 2A-2B show an example flow for enabling the electronic device 104-1 for cloud-based management. A similar flow can be performed for each of the other selected electronic device(s). The process 204 includes tasks 204-1 to 204-7.

In the example of FIG. 1, the computer system 108 can present a baseboard management controller (BMC) UI 126 to allow the user at the computer system 108 to interact with a BMC 128 in the electronic device 104-1. The BMC 128 includes a network interface 129 that allows the BMC 128 to communicate over a network.

In addition to the BMC 128, the electronic device 104-1 further includes a processor 150, a memory 152, and an input/output (I/O) device 154 (or multiple processors, multiple memories, and/or multiple I/O devices).

In the ensuing discussion, reference is made to components of the electronic device 104-1. Other electronic devices, including the electronic device 104-N, can include similar components.

A "BMC" can refer to a specialized service controller that monitors the physical state of a computing node (e.g., any of electronic devices 104-1 to 104-N) using sensors and communicates with a remote management system (e.g., the cloud-based management system 102) (that is remote from the computing node) through an independent "out-of-band" connection. The BMC has management capabilities to manage components of the computing node. Examples of management capabilities of the BMC can include any or some combination of the following: power control to perform power management of the computing node (such as to transition the computing node between different power consumption states in response to detected events), thermal monitoring and control of the computing node (such as to monitor temperatures of the computing node and to control thermal management devices of the computing node), fan control of fans in the computing node, system health monitoring based on monitoring measurement data of various sensors of the computing node, remote access of the computing node (to access the computing node over a network, for example), remote reboot of the computing node (to trigger the computing node to reboot using a remote command), system setup and deployment of the computing node, system security to implement security procedures in the computing node, and so forth.

In some examples, the BMC can provide so-called "lights-out" functionality for computing nodes. The lights out functionality may allow a user, such as a systems administrator, to perform management operations on the computing node even if an operating system (OS) is not installed or not functional on the computing node.

Moreover, in some examples, the BMC can run on auxiliary power provided by an auxiliary power supply (e.g., a battery); as a result, the computing node does not have to be powered on to allow the BMC to perform the BMC's operations. The auxiliary power supply is separate from a main power supply that supplies powers to other components (e.g., the main processor 150, the memory 152, the I/O device 154, etc.) of the computing node.

In some examples, the user at the computer system 108 uses the BMC UI 126 to enable cloud-based management for an electronic device. In other examples, the computer system 108 can enable cloud-based management for an electronic device in a different manner, such as by interaction through an interface (e.g., a Representational State Transfer (REST) interface or another type of interface, such as an application programming interface (API) or a different interface). In further examples, the BMC 128 can auto-initiate a connection with the computer system 108 when the BMC 128 is powered on or otherwise started.

The BMC 128 includes a BMC onboarding engine 130 that receives (at 204-1) an indication through the BMC UI 126 that cloud-based management for the electronic device 104-1 is to be enabled. For example, the indication can be provided in response to the user at the computer system 108 selecting a control item in the BMC UI 126, entering a command in the BMC UI 126, and so forth.

In response to the indication, the BMC onboarding engine 130 initiates a process to obtain a certificate from a certificate manager 132, which can include a computer or a collection of computers, for example. In some examples, the certificate manager 132 manages the provision of Public Key Infrastructure (PKI) certificates, which are digital certificates used to authenticate users or devices. In another example, the electronic device 104-1 can be shipped from the factory with an unalterable certificate embedded in the hardware (e.g., in the BMC's certificate store 140) that provides similar functionality to the certificate obtained from the certificate manager 132.

The BMC onboarding engine 130 verifies (at 204-2) that the certificate manager 132 can be trusted. The BMC 128 may be pre-provisioned with a certificate authority (CA) chain for the certificate manager 132, referred to as a "certificate manager CA chain." The certificate manager CA chain can be stored as part of CA chain information 136 in a trust store 138. The trust store 138 may also be stored in a non-volatile memory of the BMC 128. A CA chain (or chain of trust) is made up of a collection of certificates that start from a device's certificate and terminates with a root certificate. If the device's certificate is to be trusted, its signature has to be traceable back to the root CA. In the CA chain, each certificate is signed by the entity that is identified by the next certificate along the CA chain. The BMC onboarding engine 130 uses the certificate manager CA chain retrieved from the trust store 138 to verify that the certificate manager 132 can be trusted.

Once the BMC onboarding engine 130 verifies the certificate manager 132, the BMC onboarding engine 130 establishes (at 204-3) a secure connection with the certificate manager 132. The BMC 128 is communicatively coupled to the certificate manager 132 over a network, such as the network 106 or a different network.

The BMC 128 can establish the secure connection with the certificate manager 132 using the certificate manager CA chain. In some examples, the secure connection between the BMC 128 and the certificate manager 132 can include a Transport Layer Security (TLS) connection. In other examples, other types of secure connections can be established between the BMC 128 and the certificate manager 132.

To obtain the certificate from the certificate manager 132, the BMC onboarding engine 130 sends (at 204-4) a certificate signing request (CSR) to the certificate manager 132 over the secure connection. The CSR includes a public key of a public-private key pair and the device identification information (e.g., any or some combination of the serial number, product identifier, UUID, etc.) of the electronic device 104-1.

The public-private key pair (which includes the public key and a private key of the BMC 128) may be generated by a cloud connect engine 148 in the BMC 128. The cloud connect engine 148 is to establish a connection with a cloud service.

The BMC 128 can include another entity, such as a security manager (not shown), that can be requested by the cloud connect engine 148 to generate the public key and the private key of the public-private key pair. The private key can be encrypted and stored in a key store 134, which can be stored in a non-volatile memory of the BMC 128.

Although reference is made to an example in which the cloud connect engine 148 and the security manager are involved in generating the public-private key pair, in other examples, the generation of the public-private key pair can be performed by another module in the BMC 128 (e.g., the BMC onboarding engine 130) or by a trusted entity outside the BMC 128 or can be preloaded in the BMC 128 at the factory.

In response to receiving the CSR, the certificate manager 132 verifies (at 204-5) the CSR. If the certificate manager 132 is able to verify the CSR, the certificate manager 132 sends (at 204-6) a signed certificate to the electronic device 104-1. The signed certificate refers to the certificate signed with a private key of the certificate manager 132. The signed certificate can include device identification information (e.g., any or some combination of the serial number, the product identifier, the UUID, etc., of the electronic device 104-1) of the electronic device 104-1.

In response to receiving the signed certificate, the BMC onboarding engine 130 can store (at 204-7) the signed certificate in a certificate store 140 as a certificate 142. The certificate store 140 can be contained in a non-volatile memory of the BMC 128.

The key store 134, the trust store 138, and the certificate store 140 can be contained in separate non-volatile memories or in the same non-volatile memory.

The BMC onboarding engine 130 next initiates a device activation process 206 to activate the electronic device 104-1 for establishing a connection with the cloud-based management system 102. The device activation process 206 is performed with a device activation engine 144 that is part of the cloud services platform 112. In other examples, the device activation engine 144 can be part of the cloud-based management system 102.

The device activation process 206 includes tasks 206-1 to 206-6. Note that the device activation process 206 can be performed by each of the electronic devices 104-1 to 104-N.

The BMC 128 is provisioned with device endpoint information that refers to an endpoint that the BMC 128 is to access for performing device activation of the electronic device 104-1 for cloud-based management. In some examples, the device endpoint information (e.g., a URL such as device.cloud.company.com, a network address, etc.) can identify a network location at which the device activation engine 144 can be accessed.

The BMC onboarding engine 130 establishes (at 206-1), using the certificate 142, a secure connection with the device activation engine 144 over a network, such as the network 106. As part of establishing the secure connection, the BMC onboarding engine 130 verifies the device activation engine 144 using a cloud services CA chain that is stored as part of the CA chain information 136 in the trust store 138. In some examples, the secure connection is an mTLS connection. mTLS refers to an extension of TLS to provide mutual authentication. In other examples, the BMC onboarding engine 130 can establish a different type of secure connection with the device activation engine 144.

The device activation engine 144 extracts (at 206-2) the device identification information (e.g., any or some combination of the serial number, product identifier, the UUID, etc.) of the electronic device 104-1 from the certificate 142 received over the secure connection from the BMC onboarding engine 130. The device activation engine 144 compares (at 206-3) the device identification information to device identification information in the device inventory information 116 contained in the cloud services database 118. If the device activation engine 144 determines (at 206-4) that the device identification information of the electronic device 104-1 is in the device inventory information 116, then the device activation engine 144 can confirm that the electronic device 104-1 is in fact an electronic device eligible for cloud-based management. In response, the device activation engine 144 sends (at 206-5) cloud-based management system endpoint information to the BMC onboarding engine 130. The cloud-based management system endpoint information (e.g., a URL, a network address, etc.) identifies a location at which the cloud-based management system 102 can be accessed.

If the electronic device identified by the device identification information extracted from the certificate 142 is not present in the device inventory information 116, then the device activation process fails (at 206-6), and the electronic device 104-1 is not onboarded for cloud-based management.

In response to successful device activation (indicated by the cloud-based management system endpoint information sent from the device activation engine 144 to the BMC 128), the BMC onboarding engine 130 initiates a device connection process 208 with the cloud-based management system 102, to connect the electronic device 104-1 to the cloud-based management system 102 to allow the cloud-based management system 102 to manage the electronic device 104-1.

Note that the device connection process 208 can be performed by each of the electronic devices 104-1 to 104-N. The device connection process 208 includes tasks 208-1 to 208-9.

The cloud connect engine 148 initiates the establishment of the secure connection 146 with the cloud-based management system 102 by sending (at 208-1) a request to the cloud onboarding engine 120 at a location specified by the cloud-based management system endpoint information returned by the device activation engine 144 to the BMC onboarding engine 130 as part of the device activation process 206.

In response to the request, the cloud connection engine 148 in the BMC 128 and the cloud onboarding engine 120 in the cloud-based management system 102 establish (at 208-2) the secure connection 146 with the cloud-based management system 102 (or a module in the cloud-based management system 102). As part of establishing the secure connection 146, the cloud connect engine 148 uses a cloud-based management system CA chain stored in the CA chain information 136 in the trust store 138, and the cloud onboarding engine 120 can verify the BMC 128 by using a certificate chain preloaded to the cloud-based management system 102.

After the establishment of a secure connection 146 with the cloud onboarding engine 120 of the cloud-based management system 102, the BMC onboarding engine 130 can interact with the cloud onboarding engine 120 to complete the onboarding of the electronic device 104-1 for cloud-based management.

The BMC onboarding engine 130 can send (at 208-3) the certificate 142 to the cloud onboarding engine 120.

The cloud onboarding engine 120 extracts (at 208-4) the device identification information from the certificate 142 sent by the BMC onboarding engine 130. The cloud onboarding engine 120 compares (at 208-5) the extracted device identification information with device identification information in the selected electronic device information 124 stored in the cloud-based management database 122.

The cloud onboarding engine 120 determines (at 208-6) whether the extracted device identification information is in the selected electronic device information 124.

The cloud onboarding engine 120 accepts (at 208-7) the secure connection 146 in response to confirming that the extracted device identification information of the electronic device 104-1 is in the selected electronic device information 124, and thus confirming that the cloud-based management system 102 is to perform a cloud-based management of the electronic device 104-1 over the secure connection 146.

If the extracted device identification information is not in the selected electronic device information 124, then the cloud onboarding engine 120 would reject (at 208-8) the establishment of the secure connection 146, such that onboarding of the electronic device 104-1 for cloud-based management by the cloud-based management system 102 would fail.

In some examples, the secure connection 146 includes a WebSocket connection over mTLS. In other examples, the secure connection can be a different type of connection. In further examples, due to the likelihood of network disruptions between the electronic device 104-1 and the cloud-based management system 102, techniques or mechanisms can be provided to keep the secure connection 146 alive and/or to retry the establishment of the secure connection 146 in case the secure connection 146 is dropped.

In some examples, once the secure connection 146 is accepted by the cloud-based management system 102, the BMC 128 sends (at 208-9) device health data of the electronic device 104-1 to the cloud-based management system 102. Examples of device health data can include any or some combination of the following: status of a fan, status of the memory 152, status of the processor 150, status of a power supply, a temperature, device inventory information, and so forth.

The health data can be contained in data packets with headers that contain device identification information of the electronic device 104-1. The cloud onboarding engine 120 in the cloud-based management system 102 can compare the device identification information in the header of each data packet containing device health data to the selected electronic device information 124 to ensure that the electronic device 104-1 was selected for cloud-based management. This additional check at the cloud-based management system 102 provides a further security check that the electronic device 104-1 is legitimate. The check based on health data can be omitted in other examples.

Before serving any requests from the BMC 128 to the cloud-based management system 102 for purposes of performing cloud-based management, the BMC 128 expects a Redfish endpoint registration request from the cloud onboarding engine 120. If the BMC 128 does not receive the Redfish endpoint registration within a timeout interval, the BMC 128 can tear down the secure connection 146. Redfish refers to a standard to deliver management of electronic devices. More generally, the BMC 128 expects a management registration request from the cloud onboarding engine 120 of the cloud-based management system 102, where the management registration request is to register handling of events from the electronic device 104-1. Tearing down the secure connection 146 if the management registration request is not received by the BMC 128 within the timeout interval enhances security for the cloud-based management, since the BMC 128 uses receipt of the management registration request as further confirmation that the cloud-based management system 102 is legitimate.

For further security, the BMC 128 can perform a scheduled teardown of the secure connection 146, such as once every 24 hours or some other time period. Once the secure connection 146 is torn down, the device activation process 206 and the device connection process 208 can be re-iterated.

Figure 3:
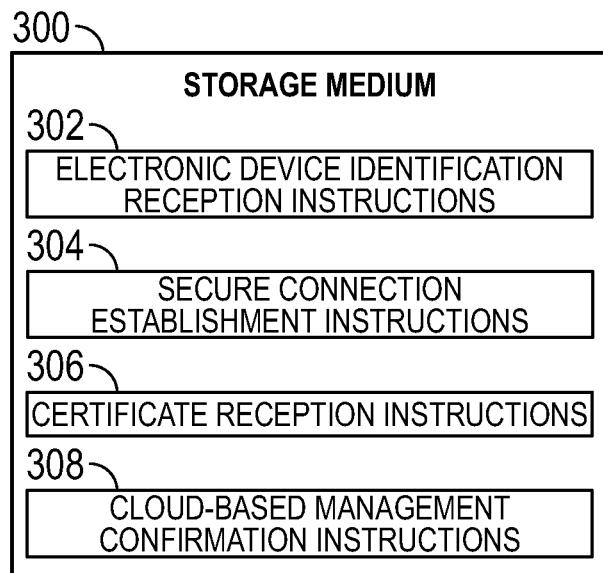
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a cloud-based management system (e.g., 102) to perform various tasks. The machine-readable instructions are executable on a collection of processors. A processor can include a microprocessor, a core of a multi-core microprocessor, a microcontroller, a programmable integrated circuit, a programmable gate array, or another hardware processing circuit.

The machine-readable instructions include electronic device identification reception instructions 302 to receive information (such as in event(s) sent by the cloud services platform 112 to the cloud-based management system 102 at 202-4 in FIG. 2A) identifying electronic devices to be onboarded for cloud-based management by the cloud-based management system.

The machine-readable instructions include secure connection establishment instructions 304 to receive, from a first electronic device, a request (e.g., 208-3 in FIG. 2B) to establish a secure connection (e.g., 146 in FIG. 1) between the cloud-based management system and the first electronic device.

The machine-readable instructions include certificate reception instructions 306 to receive, from the first electronic device, a certificate (e.g., 208-4 in FIG. 2B).

The machine-readable instructions include cloud-based management confirmation instructions 308 to confirm, based on information in the certificate and the information identifying the electronic devices to be onboarded for cloud-based management, that the cloud-based management system is to perform the cloud-based management of the first electronic device over the secure connection.

In some examples, the information identifying the electronic devices to be onboarded for cloud-based management is responsive to customer login to a portal (e.g., 110 in FIG. 1) coupled to the cloud-based management system. The customer login allows a user (such as an administrator) to select electronic devices eligible for cloud-based management, to ensure that the cloud-based management system does not perform cloud-based management of electronic devices not selected, for enhanced security.

In some examples, the information identifying the electronic devices to be onboarded for cloud-based management is included in a collection of events, where each event of the collection of events includes device identification information of an electronic device. The collection of events allows for an efficient mechanism to communicate electronic devices selected for cloud-based management.

In some examples, the cloud-based management system stores the information identifying the electronic devices subject to cloud-based management in a data repository (e.g., 124 in the cloud-based management database 122 in FIG. 1). The confirming that the cloud-based management system is to perform the cloud-based management of the first electronic device over the secure connection includes accessing the data repository to retrieve the information identifying the electronic devices subject to cloud-based management.

In some examples, the request to establish the secure connection is sent to a location identified by cloud-based management system endpoint information, and wherein the cloud-based management system endpoint information was provided to the first electronic device as part of a device activation process to activate the first electronic device. Employing the device activation process to supply the cloud-based management system endpoint information provides enhanced security by preventing the first electronic device from being able to be cloud-based managed unless the first electronic device passes the device activation process.

In some examples, the cloud-based management system receives health data from the first electronic device (e.g., 208-9 in FIG. 2B), and compares device identification information in the heath data to information for the first electronic device to the information identifying the electronic devices to be onboarded (e.g., 124 in FIG. 1). The confirming that the cloud-based management system is to perform the cloud-based management of the first electronic device is further based on the comparing.

Figure 4:
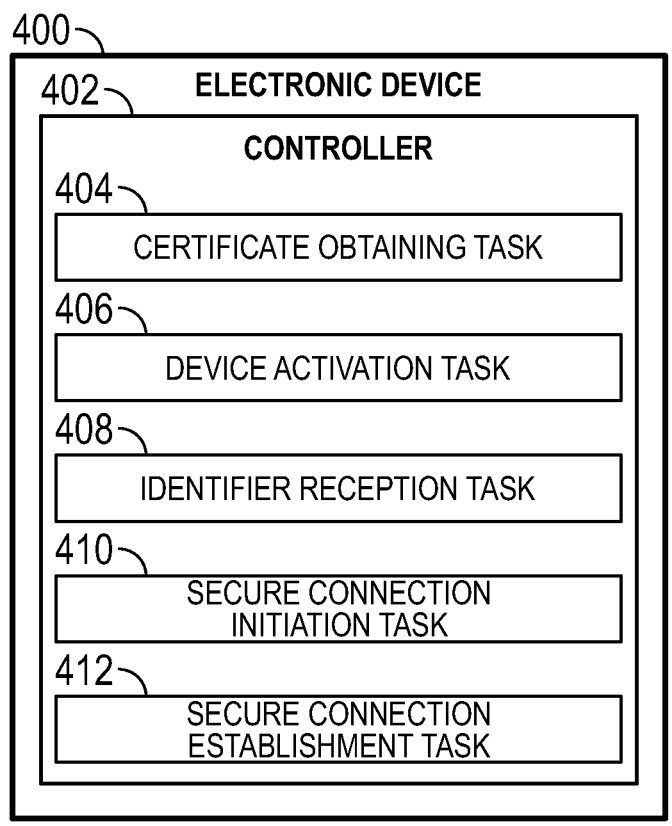
FIG. 4 is a block diagram of an electronic device according to some examples.

FIG. 4 is a block diagram of an electronic device 400 (e.g., one of electronic devices 104-1 to 104-N). The electronic device 400 includes a controller 402, which can be a BMC. In other examples, the controller 402 can include a smart network interface controller or another type of controller.

The controller 402 can perform various tasks.

The tasks include a certificate obtaining task 404 to obtain a certificate from a certificate service (e.g., the certificate manager 132 of FIG. 1).

The tasks include a device activation task 406 to activate, with a cloud service (e.g., part of the cloud services platform 112), the electronic device for cloud-based management.

The tasks include an identifier reception task 408 to receive, from the cloud service as part of the activation, an identifier (e.g., the cloud-based management system endpoint information received at 206-6 in FIG. 2B) associated with a cloud-based management system.

The tasks include a secure connection initiation task 410 to initiate, using the identifier, a secure connection with the cloud-based management system, where the initiating includes sending the certificate to the cloud-based management system, the certificate including information identifying the electronic device to be onboarded for cloud-based management.

The tasks include a secure connection establishment task 412 to establish the secure connection if the cloud-based management system confirms based on the information in the certificate that the electronic device is to onboarded for cloud-based management.

In some examples, the controller 402 is to verify the cloud service or the cloud-based management system using certificate information (a CA chain) stored in the controller 402.

In some examples, after the establishing of the secure connection, the controller 402 is to wait for a cloud management registration request sent by the cloud-based management system, and in response to failing to receive the cloud management registration request, tear down the secure connection.

In some examples, the controller 402 is to tear down the secure connection on a scheduled basis, and after tearing down the secure connection, start a process to establish another secure connection with the cloud-based management system.

Figure 5:
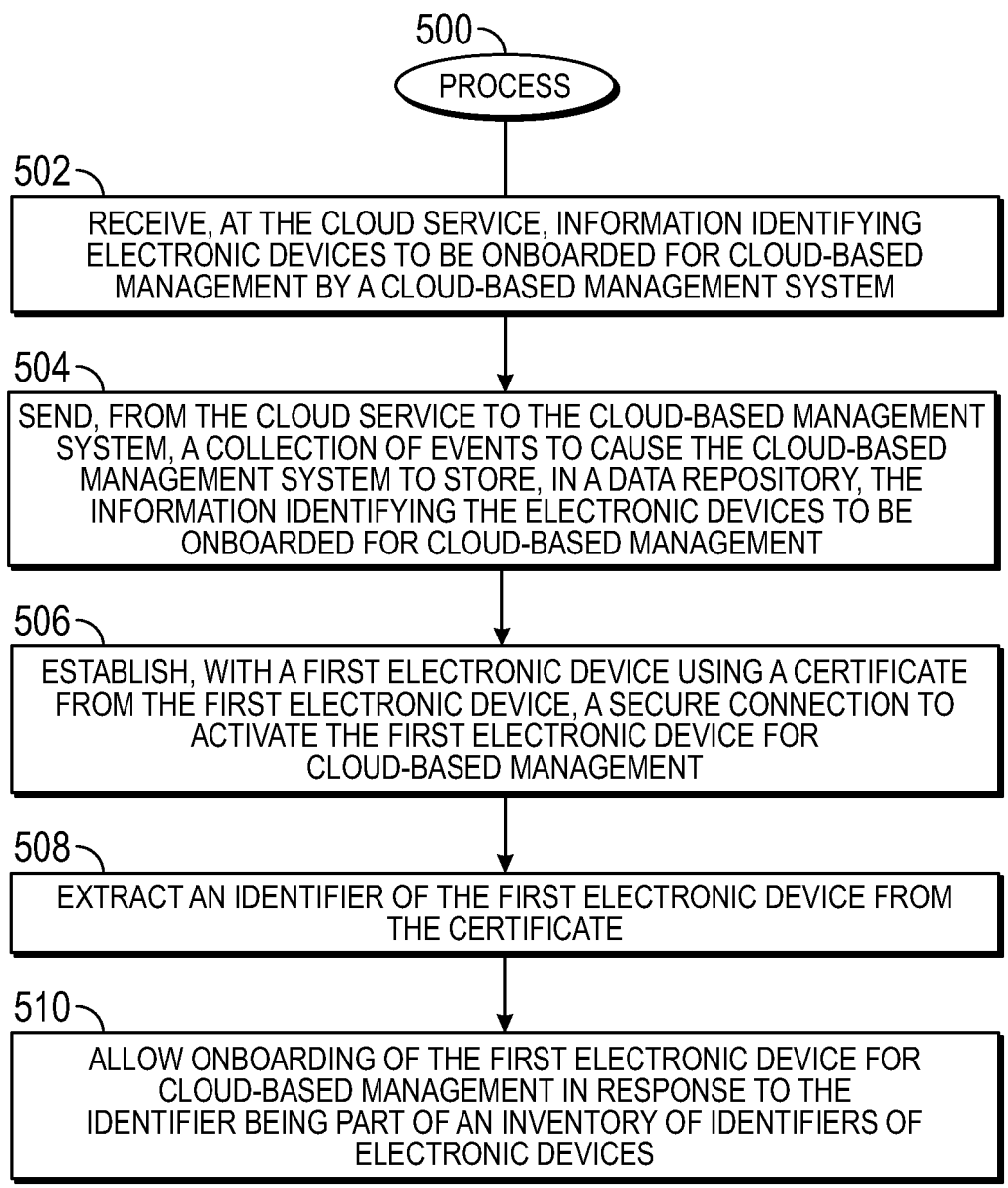
FIG. 5 is a flow diagram of a process according to further examples.

FIG. 5 is a flow diagram of a process 500 according to some examples. The process 500 can be performed by a cloud service, such as in the cloud services platform 112.

The process 500 includes receiving (at 502), at the cloud service, information identifying electronic devices to be onboarded for cloud-based management by a cloud-based management system.

The process 500 includes sending (at 504), from the cloud service to the cloud-based management system, a collection of events to cause the cloud-based management system to store, in a data repository (e.g., 122 in FIG. 1), the information identifying the electronic devices to be onboarded for cloud-based management.

The process 500 includes establishing (at 506), with a first electronic device using a certificate from the first electronic device, a secure connection to activate the first electronic device for cloud-based management.

The process 500 includes extracting (at 508) an identifier of the first electronic device from the certificate.

The process 500 includes allowing (at 510) onboarding of the first electronic device for cloud-based management in response to the identifier being part of an inventory of identifiers of electronic devices (e.g., 118 in FIG. 1).

A storage medium (e.g., 300 in FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising: a controller; and
a non-transitory storage medium comprising instructions executable on the controller to:
receive, from a computer, an indication that remote management by a management system is to be enabled for the electronic device;

in response to the indication, obtain a certificate comprising an identifier of the electronic device to be onboarded for the remote management;
activate, with a service, the electronic device for the remote management by sending the certificate to the service;
receive, from the service as part of the activation and in response to the service confirming that the identifier of the electronic device extracted from the certificate is in a database, an identifier associated with the management system;
initiate, using the identifier associated with the management system, a secure connection with the management system, wherein the initiating comprises sending the certificate to the management system; and
establish the secure connection if the management system confirms based on comparing by the management system the identifier of the electronic device in the certificate with stored information containing identifiers of electronic devices to be onboarded for remote management.

2. The electronic device of claim 1, wherein the controller comprises a baseboard management controller.

3. The electronic device of claim 1, wherein the controller comprises a smart network interface controller.

4. The electronic device of claim 2, wherein the baseboard management controller is to present a user interface (UI) at the computer, and the indication that the remote management is to be enabled for the electronic device is received from the computer based on a user selection made in the UI.

5. The electronic device of claim 2, wherein the baseboard management controller is to verify the management system using certificate information stored in the baseboard management controller.

6. The electronic device of claim 1, wherein the controller is to:
after the establishing of the secure connection:
wait for a management registration request sent by the management system; and
in response to failing to receive the management registration request, tear down the secure connection.

7. The electronic device of claim 1, wherein the controller is to:
tear down the secure connection on a scheduled basis; and
after tearing down the secure connection, start a process to establish another secure connection with the management system.

8. The electronic device of claim 1, wherein the controller is to:
send, from the controller, health data in a packet to the management system over the secure connection, the packet containing the identifier of the electronic device for comparison, at the management system, with the stored information containing the identifiers of the electronic devices to verify that the electronic device that sent the health data is selected for management.

9. A non-transitory machine-readable storage medium comprising instructions that upon execution cause a controller of an electronic device to:
receive, at the controller of the electronic device from a computer, an indication that remote management by a management system is to be enabled for the electronic device;
in response to the indication, obtain a certificate comprising an identifier of the electronic device to be onboarded for the remote management;
activate, with a service, the electronic device for management by sending the certificate to the service;
receive, at the controller from the service as part of the activation and in response to the service confirming that the identifier of the electronic device extracted from the certificate is in a database, an identifier associated with the management system;
initiate, using the identifier associated with the management system, a secure connection with the management system, wherein the initiating comprises sending the certificate to the management system; and
establish the secure connection between the controller and the management system if the management system confirms based on comparing by the management system the identifier of the electronic device in the certificate with stored information containing identifiers of electronic devices to be onboarded for remote management.

10. The non-transitory machine-readable storage medium of claim 9, wherein the controller comprises a baseboard management controller.

11. The non-transitory machine-readable storage medium of claim 10, wherein the baseboard management controller is to present a user interface (UI) at the computer, and the indication that the remote management is to be enabled for the electronic device is received from the computer based on a user selection made in the UI.

12. The non-transitory machine-readable storage medium of claim 10, wherein the baseboard management controller is to verify the management system using certificate information stored in the baseboard management controller.

13. The non-transitory machine-readable storage medium claim 9, wherein the instructions upon execution cause the controller to:
after the establishing of the secure connection:
wait for a management registration request sent by the management system; and
in response to failing to receive the management registration request at the controller, tear down the secure connection.

14. The non-transitory machine-readable storage medium of claim 9, wherein the instructions upon execution cause the controller to:
tear down the secure connection on a scheduled basis; and
after tearing down the secure connection, start a process to establish another secure connection with the management system.

15. The non-transitory machine-readable storage medium of claim 9, wherein the instructions upon execution cause the controller to:
send, from the controller, health data in a packet to the management system over the secure connection, the packet containing the identifier of the electronic device for comparison, at the management system, with the stored information containing the identifiers of the electronic devices to verify that the electronic device that sent the health data is selected for management.

16. A method comprising:
receiving, at a controller of an electronic device from a computer, an indication that remote management by a management system is to be enabled for the electronic device;
in response to the indication, obtaining, by the controller, a certificate comprising an identifier of the electronic device to be onboarded for the remote management;

activating, by the controller with a service, the electronic device for the remote management by sending the certificate to the service;

receiving, at the controller from the service as part of the activation and in response to the service confirming that the identifier of the electronic device extracted from the certificate is in a database, an identifier associated with the management system;

initiating, by the controller using the identifier associated with the management system, a secure connection with the management system, wherein the initiating comprises sending the certificate to the management system; and establishing, by the controller, the secure connection between the controller and the management system if the management system confirms based on comparing by the management system the identifier of the electronic device in the certificate with stored information containing identifiers of electronic devices to be onboarded for the remote management.

17. The method of claim 16, wherein the controller comprises a baseboard management controller, and wherein the baseboard management controller presents a user interface (UI) at the computer, and the indication that the remote management is to be enabled for the electronic device is received from the computer based on a user selection made in the UI presented at the computer by the baseboard management controller.

18. The method of claim 16, further comprising:

sending, from the controller, health data in a packet to the management system over the secure connection, the packet containing the identifier of the electronic device for comparison, at the management system, with the stored information containing the identifiers of the electronic devices to verify that the electronic device that sent the health data is selected for the remote management.

* * * * *